M. C. DAVIS.
Machine for Shearing Sheep.
No. 53,277.
Patented March 20, 1866.
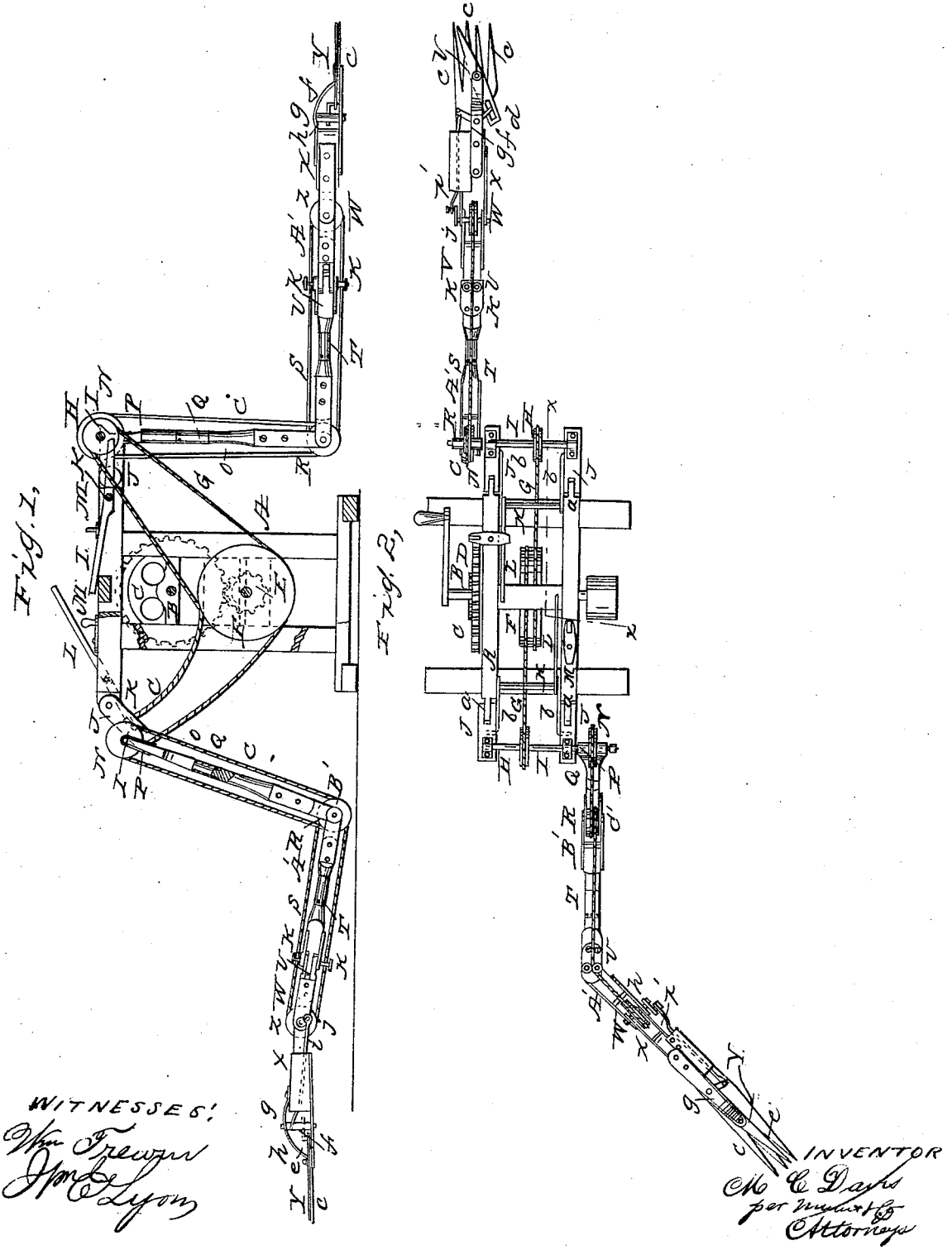
WITNESSES:
INVENTOR

UNITED STATES PATENT OFFICE.

M. C. DAVIS, OF GUILFORD, OHIO.

IMPROVEMENT IN MACHINES FOR SHEARING SHEEP.

Specification forming part of Letters Patent No. 53,277, dated March 20, 1866.

*To all whom it may concern:*

Be it known that I, M. C. DAVIS, of Guilford, in the county of Medina and State of Ohio, have invented a new and Improved Machine for Shearing Sheep; and I do hereby declare that the following is a full, clear, and exact description thereof, which will enable those skilled in the art to make and use the same, reference being had to the accompanying drawings, forming part of this specification, in which—

Figure 1 is a side view of my invention, partly in section, as indicated by the line $x\ x$, Fig. 2; Fig. 2, a plan or top view of the same.

Similar letters of reference indicate corresponding parts.

This invention relates to an improvement on a machine for shearing sheep for which Letters Patent were granted to me bearing date January 3, 1865.

The object of the present invention is to render the machine more convenient than hitherto, and to admit of two cutting devices being employed, so that two sheep may be sheared simultaneously.

A represents an upright framing having a horizontal shaft, B, fitted in it, with a toothed wheel, C, at one end, which gears into a pinion, D, on a shaft, E, also placed horizontally in the framing below shaft B. On this shaft E there is keyed a drum, F, around which two belts, G G, pass, said belts also passing around pulleys H H on shafts I I, the bearings of which are on bars J, secured to the ends of the framing A by joints $a$. These bars J have arms $b$ secured to their inner sides, and these arms are attached to shafts K, fitted transversely in the upper part of the framing A, and having each a lever, L, attached to them by moving which the bars J and consequently the shafts I, may be raised and lowered, and the belts G rendered taut or loose, in order to rotate the shafts I or render them inoperative, as may be desired. In order to operate or rotate the shafts I the bars J are raised and retained in an elevated position by means of buttons M, which are turned so as to project over the levers L and hold them down.

Besides the pulleys H on the shafts I there are keyed other pulleys, N, and bars O are also secured to said shafts by metal straps P, so as to swing loosely thereon, the pulleys N working in slots in the bars O. These bars O are each provided with a swivel-joint, Q, near their centers, and the outer ends of the bars O are connected, by hinge-joints R, to bars S, which are also constructed with swivel-joints T. The outer ends of the bars S are connected, by hinge-joints U, to bars V, the joints U working at right angles to the joints R when the cutters are in a horizontal position, and the outer ends of the bars V are connected, by hinge-joints W, to bars X, the joints W working at right angles to the joints U, and consequently in a direction corresponding to the joint R. This arrangement of the hinge and swivel joints admits of a perfectly flexible connection of the bars O S V X, so that the cutters which are attached to the outer bars, X, may be manipulated in any direction and passed over the body of the sheep with the greatest facility. These cutters are composed of three or more stationary or fixed cutters, $c$, secured to the under sides of the bars X, with a pivoted vibrating cutter, Y, working over the upper surface of them.

The cutters Y have an oblong slot, $d$, made in their rear part to receive pendants $e$ at the front ends of rods $f$, which are attached to arbors $g$, which have an arm, $h$, projecting from them, and these arms are connected, by rods $i$, to cranks $j$ at one end of the axes of pulleys Z, which are fitted in hinge-joints W, and serve as the pintles of the same. The pulleys Z are driven by cords or belts A′ from pulleys B′, fitted on the pintles of the hinge-joints R, and the pulleys B′ are driven by cords or belts C′ from the pulleys N. The cords or belts A′ pass or work between rollers $k\ k\ k\ k$ at the outer ends of the bars S, which rollers prevent the cords or belts A′ from slipping off from the pulleys N. By this arrangement it will be seen that a vibrating motion is communicated to the cutters Y while being moved in any direction or passed over the body of the sheep in shearing the same, and that two different persons may work with the machine at the same time and operate upon two different animals, while either cutter may be stopped independently of the other by simply releasing the lever L, which holds up its driving-shaft I.

This machine may be driven by horse, dog, steam, or water power.

Having thus described my invention, I claim as new and desire to secure by Letters Patent—

1. The arrangement of the two shafts I, jointed bars J, and the levers L, or their equivalents, whereby said shafts may be raised and lowered and rendered operative and inoperative when desired, substantially as and for the purpose specified.

2. The bars O S V X, connected by hinge-joints, in combination with the swivel-joints Q T of the bars O S, the pulleys N Z B', belts A' C', rollers $k$, and the cutters composed of a vibrating cutter, Y, and three or more fixed ones, $c$, all arranged to operate substantially in the manner as and for the purpose set forth.

M. C. DAVIS.

Witnesses:
JOSEPH ROSS,
IRA L. WELCH.